United States Patent
Li et al.

(10) Patent No.: US 11,921,618 B2
(45) Date of Patent: Mar. 5, 2024

(54) LOCATING FAILURES IN MICROSERVICE SYSTEM

(71) Applicant: Dell Products L.P., Round Rock, TX (US)

(72) Inventors: Qing Li, Shanghai (CN); Xiaojun Wu, Shanghai (CN); Haijun Zhong, Shanghai (CN); Muzhar S. Khokhar, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 181 days.

(21) Appl. No.: 17/558,093

(22) Filed: Dec. 21, 2021

(65) Prior Publication Data

US 2023/0195598 A1 Jun. 22, 2023

(51) Int. Cl.
*G06F 11/36* (2006.01)
*G06F 9/455* (2018.01)
*G06F 9/54* (2006.01)

(52) U.S. Cl.
CPC ...... *G06F 11/3636* (2013.01); *G06F 9/45558* (2013.01); *G06F 9/547* (2013.01); *G06F 2009/45591* (2013.01); *G06F 2009/45595* (2013.01)

(58) Field of Classification Search
CPC .................. G06F 11/3636; G06F 2009/45591
See application file for complete search history.

(56) References Cited

U.S. PATENT DOCUMENTS

| | | | |
|---|---|---|---|
| 11,727,016 B1 * | 8/2023 | Agarwal | G06F 16/24575 707/769 |
| 2021/0026646 A1 * | 1/2021 | Jha | G06F 9/3891 |

* cited by examiner

*Primary Examiner* — Matthew M Kim
*Assistant Examiner* — Kyle Emanuele
(74) *Attorney, Agent, or Firm* — Jackson Walker L.L.P.

(57) ABSTRACT

An information handling system may include at least one processor and a memory. The information handling system may be configured to: execute an application comprising a plurality of microservices on the at least one processor, wherein the application is configured to service external requests by executing a plurality of application programming interface (API) calls among the plurality of microservices; and for each API call: determine a span ID associated with such API call; determine a trace ID associated with a particular external request that is associated with such API call; and log the span ID and the trace ID.

18 Claims, 2 Drawing Sheets

LOCATING FAILURES IN MICROSERVICE SYSTEM

TECHNICAL FIELD

The present disclosure relates in general to information handling systems, and more particularly to locating failures in systems that use a microservice architecture.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), some information handling systems employ a microservice architecture in implementing certain applications, which may be contrasted with the traditional monolithic application architecture. It is common for microservices architectures to be adopted for cloud-native applications, serverless computing applications, and applications using lightweight container deployment. Typically in a microservice architecture, different pieces of functionality may be implemented in specifically defined and narrowly focused containers. Such applications may execute on a homogeneous or a heterogeneous cluster of information handling resources including one or more types of processing resources, one more types of storage resources, etc.

Some operational differences between a monolithic architecture and a microservice architecture are evident when troubleshooting failures. For monoliths, tracking a request to the code through its entire lifecycle is relatively straightforward with standard debugging tools. But for microservices, a request may flow through many different microservices as they pass data around using application programming interface (API) calls. This makes it more difficult to analyze the failure and locate the error that caused it.

Accordingly, some embodiments of this disclosure may provide a tracing mechanism to generate call chains among multiple microservices, so that failures can be located and diagnosed more easily.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with locating failures in a microservice system may be reduced or eliminated.

In accordance with embodiments of the present disclosure, an information handling system may include at least one processor and a memory. The information handling system may be configured to: execute an application comprising a plurality of microservices on the at least one processor, wherein the application is configured to service external requests by executing a plurality of application programming interface (API) calls among the plurality of microservices; and for each API call: determine a span ID associated with such API call; determine a trace ID associated with a particular external request that is associated with such API call; and log the span ID and the trace ID.

In accordance with these and other embodiments of the present disclosure, a method may include executing an application comprising a plurality of microservices on at least one processor of an information handling system, wherein the application is configured to service external requests by executing a plurality of application programming interface (API) calls among the plurality of microservices; and for each API call: determining a span ID associated with such API call; determining a trace ID associated with a particular external request that is associated with such API call; and logging the span ID and the trace ID.

In accordance with these and other embodiments of the present disclosure, an article of manufacture may include a non-transitory, computer-readable medium having computer-executable instructions thereon that are executable by at least one processor of an information handling system for: executing an application comprising a plurality of microservices, wherein the application is configured to service external requests by executing a plurality of application programming interface (API) calls among the plurality of microservices; and for each API call: determining a span ID associated with such API call; determining a trace ID associated with a particular external request that is associated with such API call; and logging the span ID and the trace ID.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
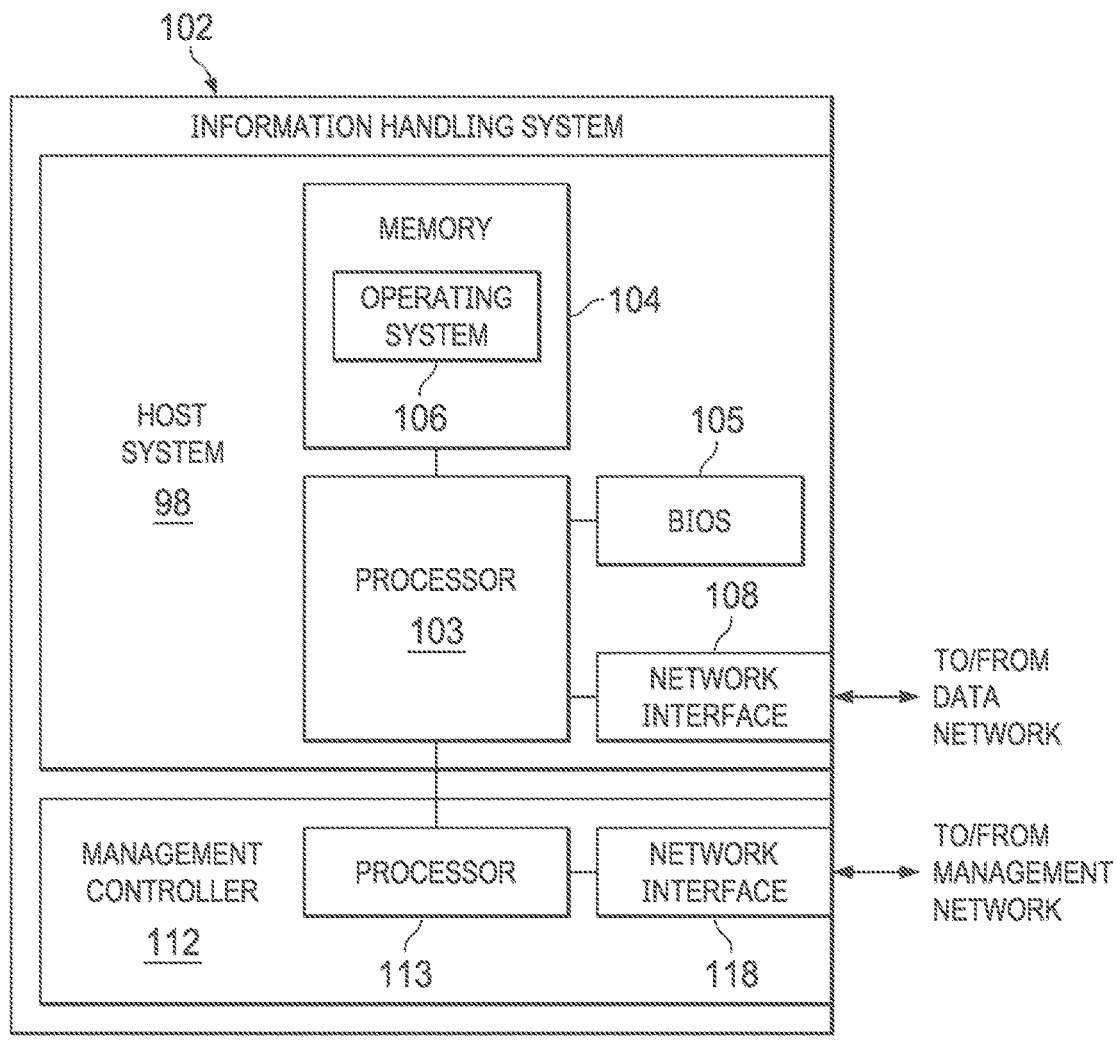
FIG. 1 illustrates a block diagram of an example information handling system, in accordance with embodiments of the present disclosure.
Figure 2:
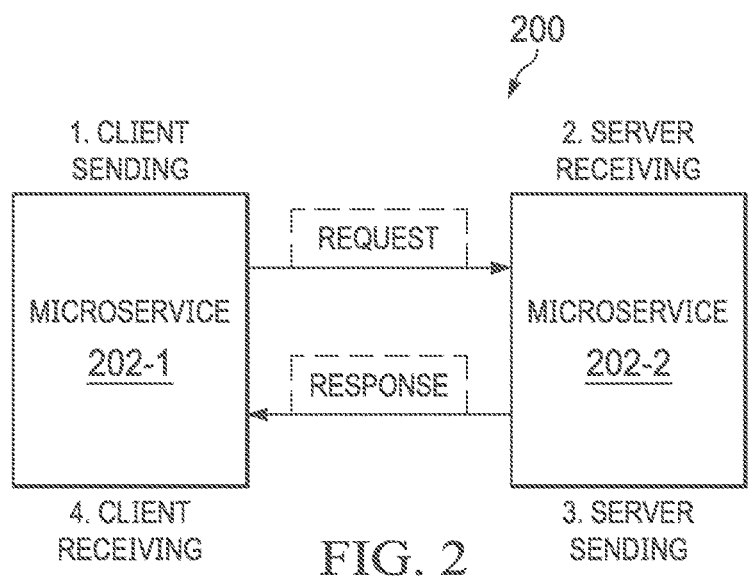
FIG. 2 illustrates a block diagram of an example microservice architecture, in accordance with embodiments of the present disclosure.
Figure 3:
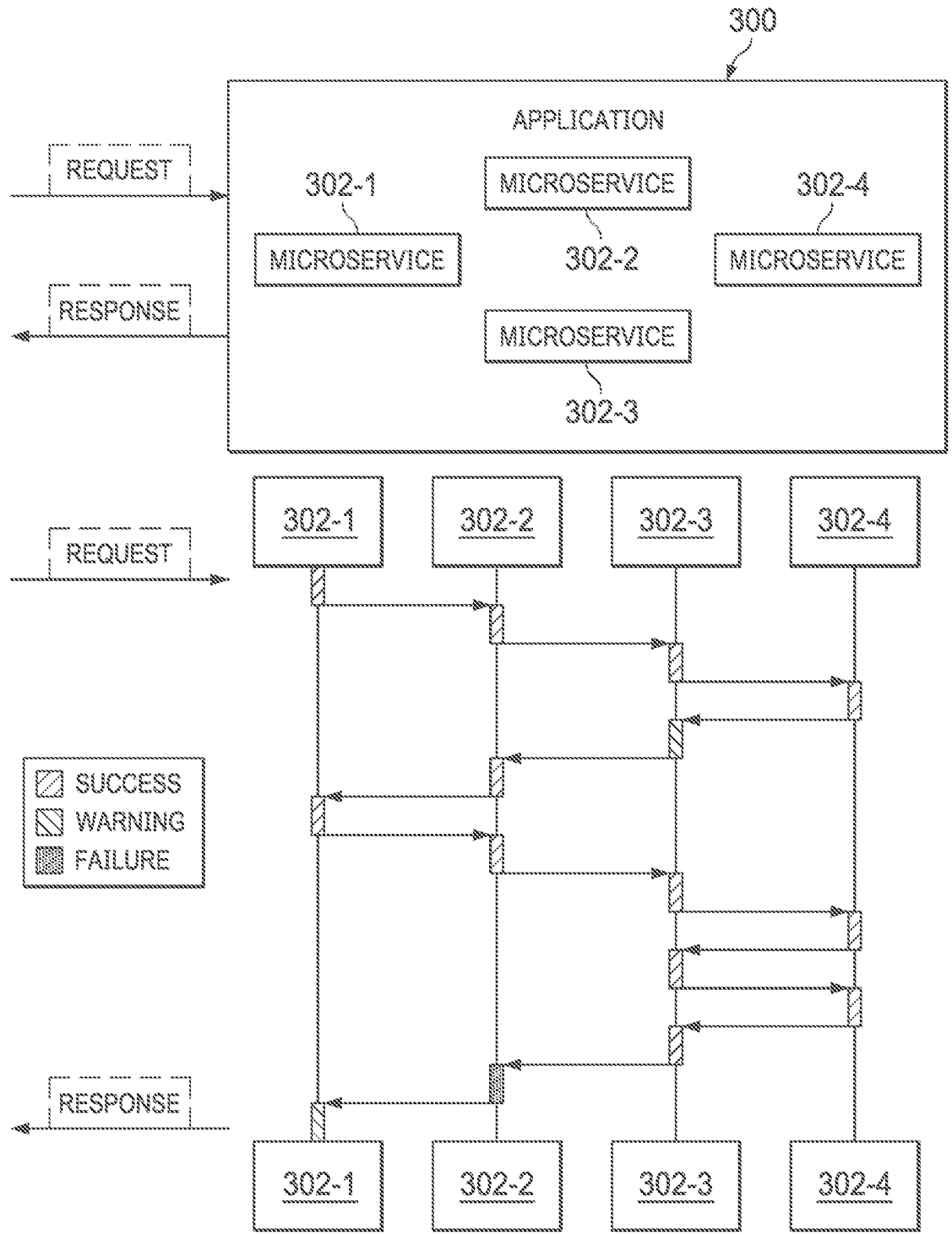
FIG. 3 illustrates a block diagram of another example microservice architecture along with a sequence diagram, in accordance with embodiments of this disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may provide a tracing mechanism to generate call chains between microservices, so that failures can be located and diagnosed more easily.

FIG. 2 illustrates an example microservice architecture 200 in which two microservices 202-1 and 202-2 (collectively, microservices 202) interact with one another. Microservice 202-1 acts as a client in this example, and it sends a request to microservice 202-2, which acts as a server. Microservice 202-2 then sends a response to microservice 202-1. In other embodiments, more than two microservices may be involved in the implementation of an application. For example, the arrangement shown in FIG. 2 may be a small portion of a larger architecture. In some embodiments, a given microservice may act as both a client and a server (e.g., by sending requests to some microservices and responding to requests from other microservices).

One embodiment of this disclosure may generate an inter-microservice call chain by using identifiers referred to herein as a "span ID" which is associated with a single API call and a "trace ID" which is associated with a sequence of API calls that are related in some way. In one embodiment, a microservice-based application may receive high-level external requests, and each such request may be assigned a unique trace ID. Then if a microservice receives a request that has a particular trace ID and needs to call out to another microservice to respond, the same trace ID may be used for that second call. The span ID and trace ID may be numerical or alphanumeric values, and they may be generated in any suitable manner to ensure that collisions are unlikely or impossible. Thus the span ID identifies a particular API transaction, and the trace ID ties together all of the API transactions that take place to service a single external request.

Whenever a request is sent from one microservice to another, it may include the relevant trace ID and span ID (e.g., as arguments in the API call) for the receiving microservice. Then whenever a microservice sends a request, receives a response, receives a request, or sends a response, it may create a log entry including the trace ID, the span ID, the caller's span ID (also referred to as a parent ID), and any other useful information such as identifying information, timestamps, program state, etc. In one embodiment, individual logs (e.g., log files) may be stored by each microservice. In another embodiment, a logging microservice may store all of the logs. (In order to prevent infinite recursion, in one embodiment, logging may be disabled on such calls to the logging microservice itself.)

When a failure (e.g., an exception, a program crash, etc.) occurs, the information that has been logged may be analyzed to derive a full call chain describing every microservice interaction associated with the failure. For example, an analysis microservice may retrieve all log entries associated with a particular trace ID, determine the correct ordering (e.g., based on their timestamps), and then combine them into a single call chain that traces the entire request through all of the microservices that were involved, indicating whether each call resulted in success, failure, or a warning. This call chain may then be used to locate the failure more easily.

Turning now to FIG. 3, an example application 300 is shown that includes four microservices 302-1, 302-2, 302-3, and 302-4 (collectively, microservices 302). Application 300 may be used to implement some desired functionality or business logic, and as an aggregate it may receive external requests and provide external responses. Within application 300, those external requests may be serviced by various ones of the microservices 302 performing API calls with one another to arrive at a response.

If application 300 encounters an unexpected failure, it may be difficult to locate and diagnose without the benefit of the overall call chain that may be provided by embodiments of the present disclosure. Without such a call chain, only the individual logs for each of the microservices 302 may be available. If some error is present in the log of microservice 302-2, it is still difficult to determine which portion of the business logic caused the error, because the API of a single microservice may be used by multiple elements of business logic, and they may occur at the same time.

However, according to embodiments of this disclosure, a call chain may be generated that reflects the entirety of the interactions for a given request to application 300. After such a call chain is generated, it may displayed graphically to allow easy determination of where the failure occurred in the complete logic across the microservices 302. Thus FIG. 3 also includes a graphical sequence diagram indicating the flow of API calls among microservices 302 that may occur as a result of a particular external request. The API calls in the sequence diagram may be color-coded in one embodiment in order to allow for quick identification of errors and/or warnings.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to:
   execute an application comprising a plurality of microservices on the at least one processor, wherein the application is configured to service external requests by executing a plurality of application programming interface (API) calls among the plurality of microservices; and
   for each API call:
   determine a span ID associated with such API call;
   determine a trace ID associated with a particular external request that is associated with such API call; and
   log the span ID and the trace ID.

2. The information handling system of claim 1, wherein the information handling system comprises a cluster of individual information handling systems.

3. The information handling system of claim 2, wherein the cluster is a hyper-converged infrastructure (HCI) cluster.

4. The information handling system of claim 1, wherein the plurality of microservices are implemented as containerized microservices.

5. The information handling system of claim 1, wherein the logging is performed by a logging microservice.

6. The information handling system of claim 1, wherein the span ID and the trace ID for each API call are passed as arguments for such API call.

7. A method comprising:
   executing an application comprising a plurality of microservices on at least one processor of an information handling system, wherein the application is configured to service external requests by executing a plurality of application programming interface (API) calls among the plurality of microservices; and
   for each API call:
   determining a span ID associated with such API call;
   determining a trace ID associated with a particular external request that is associated with such API call; and
   logging the span ID and the trace ID.

8. The method of claim 7, wherein the information handling system comprises a cluster of individual information handling systems.

9. The method of claim 8, wherein the cluster is a hyper-converged infrastructure (HCI) cluster.

10. The method of claim 7, wherein the plurality of microservices are implemented as containerized microservices.

11. The method of claim 7, wherein the logging is performed by a logging microservice.

12. The method of claim 11, wherein the span ID and the trace ID for each API call are passed as arguments for such API call.

13. An article of manufacture comprising a non-transitory, computer-readable medium having computer-executable instructions thereon that are executable by at least one processor of an information handling system for:
   executing an application comprising a plurality of microservices, wherein the application is configured to service external requests by executing a plurality of application programming interface (API) calls among the plurality of microservices; and
   for each API call:
   determining a span ID associated with such API call;
   determining a trace ID associated with a particular external request that is associated with such API call; and
   logging the span ID and the trace ID.

14. The article of claim 13, wherein the information handling system comprises a cluster of individual information handling systems.

15. The article of claim 14, wherein the cluster is a hyper-converged infrastructure (HCI) cluster.

16. The article of claim 13, wherein the plurality of microservices are implemented as containerized microservices.

17. The article of claim 13, wherein the logging is performed by a logging microservice.

18. The article of claim 17, wherein the span ID and the trace ID for each API call are passed as arguments for such API call.

\* \* \* \* \*